UNITED STATES PATENT OFFICE.

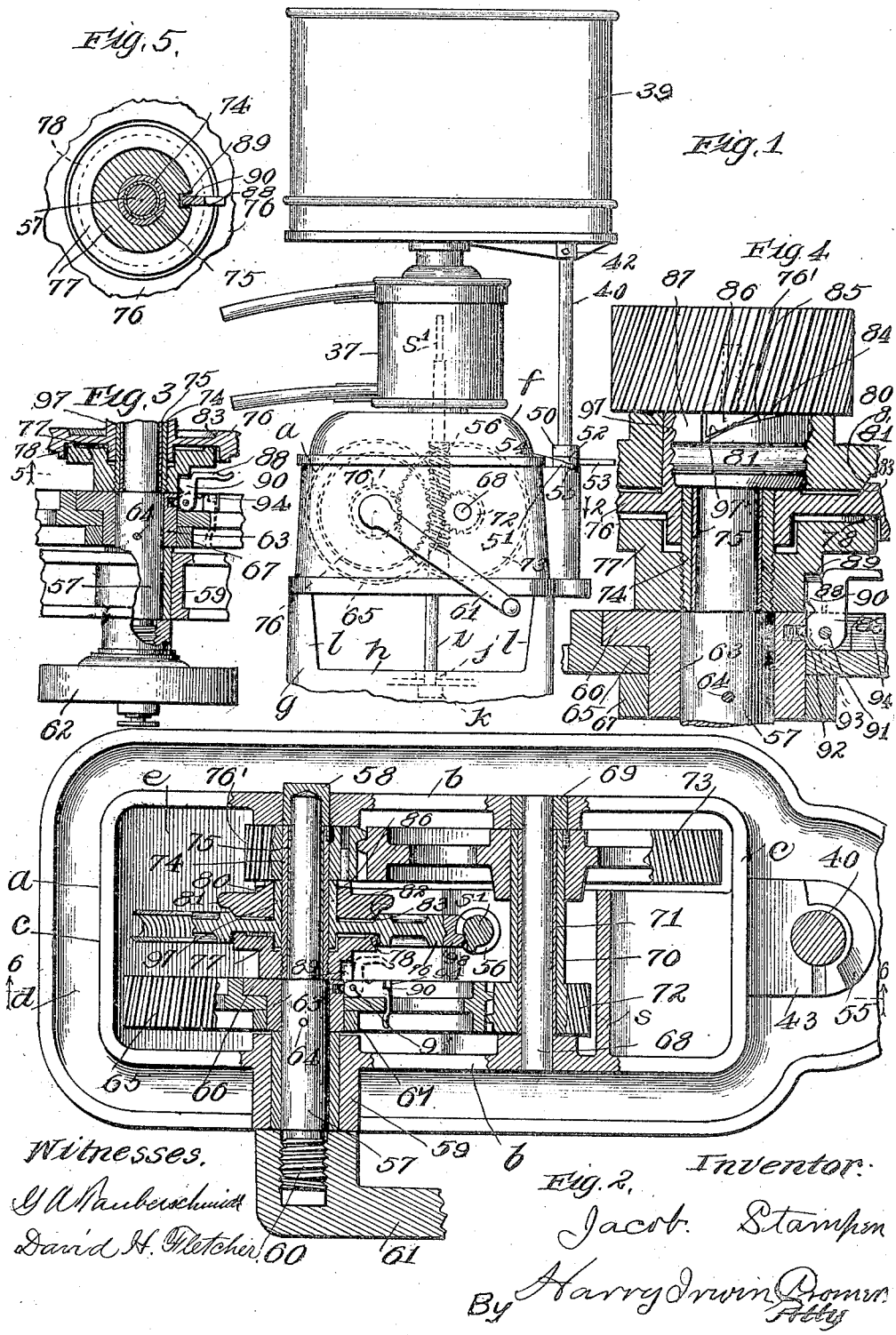

JACOB STAMPEN, OF CHICAGO, ILLINOIS.

GEARING FOR CREAM-SEPARATORS.

1,301,756.  Specification of Letters Patent.  Patented Apr. 22, 1919.

Application filed September 7, 1915. Serial No. 49,273.

*To all whom it may concern:*

Be it known that I, JACOB STAMPEN, a citizen of the United States, residing in Chicago, in the county of Cook and State of Illinois, have invented certain new and useful Improvements in Gearings for Cream-Separators, of which the following is a specification.

This invention relates to that class of cream separators or centrifugal separating machines by means of which cream or butter fat, or relatively light particles may be separated from the relatively heavy particles of milk or liquid containing such particles to be separated.

The principal object of the invention is to provide a simple, economical and efficient cream separator.

Further objects of the invention are to provide a cream separator with improved simple, and efficient means for enabling the machine to be changed with facility and in an efficient manner from a power driven to a manually operatable machine, and vice versa; to enable the machine to be so changed or converted without the use of speed-changing mechanism for operating the main driving shaft, and in such a manner that the use of any speed-changing mechanism separate from or in addition to the operative mechanism of the machine itself or the mechanism adapted to be operated by or driven by the rotation of the main driving shaft may be dispensed with; to enable all of the driving gear and speed changing mechanism to be arranged within as small a space as possible consistent with efficiency, and, by preference, within a single oil-containing compartment, and to enable all of the gears and shaft bearings, and spindle bearings to be lubricated by means of oil contained in a single oil reservoir which is adapted to enable oil contained therein to be used over and over again, and to enable the oil for lubricating the gears and bearing surfaces above the level of the oil to be carried up by a relatively slowly rotating gear wheel, with the relatively fast moving gear wheels and worm wheel above the level of the surface of the oil, thereby reducing the agitation of the oil to a minimum.

Other and further objects of the invention will appear from an examination of the specification and from an inspection of the accompanying drawings, which are made a part hereof.

The invention consists in the features, combinations, and details of construction herein described and claimed.

In the accompanying drawings Figure 1 is a view in side elevation of a cream separator constructed in accordance with my invention and improvements, with the supporting legs of the main frame broken away;

Fig. 2, an enlarged horizontal sectional view, taken on line 2 of Fig. 1, showing the driving mechanism including the shafts, gear and clutch mechanism, worm and worm wheel, and the means for connecting the main driving shaft with and disconnecting it from the gear wheel and adjacent clutch member respectively through which the main driving shaft extends, to enable the speed of rotation of the main driving shaft to be changed with respect to the speed of rotation of the bowl spindle, and convert the machine from a power driven to a manually operatable machine, and vice versa;

Fig. 3, an enlarged detail view of a portion of the main driving shaft and of the inner or central portions of the worm wheel, clutch and connecting mechanism and the main gear wheel supported by the main driving shaft, and showing a power driven pulley mounted on the main driving shaft, the parts supported by the said shaft, with the exception of said pulley, being shown in horizontal section, with portions broken away or omitted;

Fig. 4, an enlarged detail view in horizontal section similar to Fig. 3, showing the main driving shaft disconnected from the main gear wheel supported thereby, and connected with the friction clutch member and in fixed relation to the worm wheel, the pinion which is supported by the main driving shaft, and the clutch member adjacent to said pinion being shown in plan view, with a part of said clutch member broken away; and Fig. 5, a detail view in elevation taken on line 5 of Fig. 3, looking in the direction of the arrow, showing one of the friction clutch members in end elevation, with the fastening device or catch for connecting and releasing the clutch member and main driving gear wheel with relation to the main driving shaft which supports such clutch member and gear wheel.

In constructing a cream separator in accordance with my invention and improvements, I provide a main frame *a*, comprising a gear box or oil containing compartment having side walls *b*, end walls *c* and a base *d*. The gear chamber or oil reservoir *e* thus formed is provided with a cover *f* which is removably mounted upon the main frame or gear-containing chamber in position to cover and inclose the same. The main frame or gear-containing casing *a* is mounted upon a bottom frame *g* upon which the base *d* rests, said bottom frame being provided with suitable legs or bottom frame portions (not shown) which may be of any desired, ordinary or well known form. The bottom frame is by preference, provided with a transverse frame portion *h*, located beneath the base *d*, of the gear-containing casing and oil reservoir *a*, as shown in Fig. 1, and a central vertical securing bolt or rod *i*, having its upper end connected with the main frame or anchored in the bottom *n* and its lower end secured to the bottom frame portion *h*, by means of threaded nuts *j* and *k*, or other similar securing means, serves to connect the main frame with the upright corner posts *l* of the bottom frame, upon which upright portions the base of the main frame rests. These upright portions *l* of the bottom frame extend above the frame member *h* and are adapted to engage the recessed bottom portion of the base of main frame at each corner of said main frame, so that when the securing bolt *i* is tightened, the main frame will be rigidly but removably secured to the upright frame portions *l*, and only one securing bolt is required to securely connect the frame portions *a* and *g*.

The bottom end of the vertical spindle *s'* is rotatively supported by a suitable bottom bearing which may be of any ordinary well known or suitable form, and is therefore not shown in the drawings. (See Figs. 1 and 2.)

The bowl shell supporting upper end of the spindle *s'* is encircled by a stationary cream cover or receptacle 37, and a milk cover or receptacle rests upon the cream receptacle.

A milk supply can 39 is adapted to be supported in operative position by means of a removable frame or supply can supporting bracket comprising an upright frame member or standard 40 having a can-supporting shelf fixed to the upper extremity thereof by means of a socket 42 on the shelf member, into which the standard extends. The lower extremity of the standard 40 is removably and rotatively mounted in a socket portion 43 of the main frame.

The standard 40 is provided with an annular collar 50 fixed thereto, and a rotary ring or collar 52 having an operating handle or lever 53 thereon, is rotatively mounted between the collar 50 and the socket portion 43 of the frame. The collar or ring 52 has an inclined or helical bottom face or cam portion 54 adapted to engage a similarly inclined or helical upper cam portion or surface 55 of the socket member 43. By rotating the collar 54 in one direction by means of the lever 53, the standard 40 can be readily raised, so as to permit the shelf to be rotated freely with the standard 40, to carry the supply can to and from operative position. When the shelf and the supply can are to be lowered to operative position over the bowl, it is, of course, only necessary to turn the hand lever 53 and collar 52 in an opposite direction or back to the position in which the parts are shown in Fig. 1.

My improved driving mechanism by means of which the vertical bowl supporting spindle and bowl are rotated, is constructed as follows: The vertical spindle *s'* is provided with a worm 56 located inside of the oil reservoir or main frame of the machine. A main driving shaft 57 is rotatively mounted in suitable bearings 58 and 59 in the main frame, in position to extend transversely through the oil reservoir or main frame *a*. One end only of this shaft projects through the wall of the gear box or oil-containing compartment *a*. This projecting end portion 60 of the shaft 57 is provided with screw threads or similar securing means adapted to enable a crank 61 to be mounted thereon, for rotating the shaft when the machine is to be operated manually, and adapted to enable a power driven device such, for instance, as a belt pulley 62, to be used for connecting the main driving shaft with a suitable source of power, instead of the crank shaft, when the machine is to be driven by a motor, engine or similar source of power. The bearing 58 for the opposite end of the shaft 57 is, by preference in the form of a cap tightly fitted in an aperture in the side wall *b* so as to form a liquid tight closure extending over the end of the shaft and inclosing the same. An annular collar 63 is fixed to the shaft 57 by means of a pin 64, or other suitable securing means, and a toothed gear wheel 65 is rotatively mounted in position to encircle the shaft 57 and, by preference, in position to also encircle the collar or bushing 63. The collar 63 has a peripheral, or radially projecting annular portion or shoulder 66 at one extremity thereof, and has a peripheral ring or collar or flange 67 on the opposite end portion of said collar 63, and the central portion or hub of the gear wheel 65 is rotatively mounted between the parts 66 and 67 and supported in operative position by the shaft 57 and said shaft encircling members or collars. A shaft 68 is mounted in parallel relation to the main driving shaft 57 and in such position that the spindle s' extends between said shafts. This shaft 68 is, by preference non-rotatable, and mounted with its opposite extremities extending into suitable apertures in the opposite side walls b of the gear-containing compartment or oil reservoir, into which the shaft is tightly fitted. A suitable bushing 69 is interposed between the shaft 68 and the wall or frame portion into which the shaft extends at either one or both ends of the shaft, and the points of connection between the shaft and casing are thus rendered liquid tight and the shaft is securely held in fixed position.

A sleeve 70 is rotatively mounted on the fixed shaft 68, and may be provided with a hollow bushing 71 adapted to form a suitable bearing. And a pinion 72 is secured in fixed relation to and adapted to rotate with said sleeve 70, and is in toothed engagement with the main gear wheel 65 on the main driving shaft 57, already described. A gear wheel 73 is fixed to the opposite extremity of the rotative sleeve 70; and a hollow shaft or sleeve 74, which may have a hollow bushing therein to form suitable bearings, is mounted upon and encircles the main driving shaft 57. This sleeve 74 is adapted to be secured in fixed relation to the shaft 57, or to rotate with respect to said shaft, as desired, as will be more fully hereinafter described; and a pinion 76' is fixed to and adapted to rotate with said sleeve 74, and is in toothed engagement with the gear wheel 73, already described. A worm wheel 76 is mounted upon and adapted to rotate with respect to the sleeve 74 or to be secured in fixed relation to said sleeve by means of the clutch mechanism hereinafter more particularly described, and is adapted to rotate with respect to or to be secured in fixed relation to the main driving shaft, as desired. The worm wheel encircles both the sleeve 74 and the shaft 57, and is supported by said shaft and sleeve in operative position in toothed engagement with the worm 56 on the vertical bowl-supporting spindle s' already described.

Clutch mechanism for operatively connecting the main driving shaft 57 with the worm wheel 76, or for connecting the worm wheel in fixed relation to the sleeve 74 and pinion 76' so as to permit the worm wheel to rotate with the said sleeve and pinion and to rotate either with or with respect to the main driving shaft 57, as desired, and adapted to release the worm wheel so as to permit it to rotate freely with respect to the sleeve 74 and shaft 57 when desired, is constructed as follows: An annular friction clutch member 77 is mounted upon and by preference in fixed relation to the sleeve 74, and between the worm wheel and the collar 63 and gear wheel 65. (See Figs. 2, 3, and 4.) This annular clutch member 77 has an annular worm wheel-engaging or clutch portion 78 the engaging surface of which may be flat or approximately flat and adapted to engage and to be held in fixed relation to or released from fixed engagement with respect to a similar surface portion on or forming a part of the body of the worm wheel. The worm wheel is provided with an elongated endwise projecting hub portion or hollow sleeve 97 fixed to or forming a part of the body of said worm wheel, said sleeve and the central body portion of the worm wheel being made by preference of stamped metal such as iron, and provided with a toothed peripheral ring or worm engaging portion 98 of relatively softer material by preference Babbitt metal; but bronze may be employed. By making the toothed rim 98 of Babbitt metal molded or cast onto a stamped wheel body portion 76 of steel or relatively hard metal, a strong, worm wheel is obtained which is economical in construction and runs very lightly, reducing the friction between the wheel and worm to a minimum. A second clutch member 80, which is annular in form, is mounted upon and encircles and is adapted to rotate with respect to the hub or sleeve portion 97 of the worm wheel, and is provided with a peripheral weighted preferably annular clutch portion 81 located, by preference, on the opposite side of the worm wheel 76 from that on which the clutch member 77 is located. This clutch member 80 is adapted to rotate with the sleeve 74 and pinion 76', and is provided with a friction surface portion 82 adapted to be moved into and out of frictional engagement with a corresponding conical friction surface or concave clutch portion 83 on the worm wheel. The movement of the clutch member 80 into position to bring the conical friction surface 82 into clutching engagement with the friction surface 83 is facilitated by making the weighted portion 81 sufficiently heavy to provide the desired resistance to the force applied in accomplishing the initial turning or rotation of said clutch member 80 which accompanies the movement of said clutch member into frictional or clutching engagement with the worm wheel. It is desirable that such turning movement or rotation be resisted or retarded by the action of the weight, in order to facilitate and insure the obtaining of the desired movement of the clutch member 80 longitudinally of the shaft and into clutching engagement with the worm wheel.

The weighted clutch member 80 is provided with a triangular slot or notch 84 in one end and at or near the periphery of said clutch member, one wall 85 of said notch being inclined outward in the direction of the mouth of the slot and forward in the direction of the rotation of the clutch member when the machine is in operation with the clutch members in clutching position. A clutch-controlling member which is by preference in the form of a triangular endwise projecting boss or stud 86 secured in fixed relation to the sleeve 74 and pinion 76', and, by preference mounted on said pinion in position to extend into said notch 84, is provided. (See Fig. 4.) This clutch-controlling member or boss has an oblique cam surface portion 97' adjacent to the oblique cam surface portion 84 and in approximately parallel relation to and adapted to be moved into and out of engagement with said oblique surface portion 84 of the clutch member 80. This oblique or cam surface portion 97' is thus adapted to be pressed against the face 84 of the weighted clutch member when the member 86 is rotated with the pinion 76', thereby causing the weighted clutch member 80 to be pressed into and held in clutching engagement with the worm wheel, which is thus held between and in frictional engagement with the clutch members 80 and 77, thereby causing the worm wheel to rotate with the sleeve 74, pinion 76' and clutch members 77 and 80 until released. Upon stopping the rotation of the main driving shaft, the pinion 76' or sleeve 74, the rear face of the clutch-controlling boss 86 will engage the adjacent face or shoulder 87 of the weighted clutch member 80, and cause the clutch members 80 and 77 to release and permit the free forward rotation of the worm wheel. Injuries due to the too sudden stopping of the machine are thus prevented or minimized.

A movable or adjustable speed changing securing pawl or fastening device 88 is mounted upon and by preference pivotally secured to the collar or bushing 63 which is fixed to the main driving shaft 57, as already described, and the clutch member 77, is provided with a shouldered portion or pawl engaging notch 89 adapted to be moved by the rotation of the clutch member 77 into position to admit the locking lug portion 90 of the pawl 88 when the latter is rotated on its pivot 91 to the position shown in full lines in Fig. 4, and in broken lines in Fig. 2. A spring-pressed detent or ball 92 is adapted to yieldingly engage notches 93 in the locking pawl member 88, alternately, so as to hold the pawl in either of the two operative or locking positions into which it is adapted to be moved. With the locking pawl in the position above described, as shown in Fig. 4, (see also Fig. 3) the worm wheel 76 and the main driving shaft 57 are directly connected so as to rotate together or at the same speed, such connection and arrangement of the parts being suitable for enabling the machine to be operated by means of a power driven device, or belt pulley 62, as illustrated in Fig. 3.

The main gear wheel 65, already described, and which is supported by the shaft 57 is provided with a locking pawl-engaging slot or shoulder portion 94 (see Figs. 2, 3, and 4) which is adapted to be moved by rotating said gear wheel, into position to admit and engage the locking pawl 88 when the latter is moved from the position in which it is shown in Fig. 4, to the position in which it is shown in full lines in Fig. 2, thereby releasing the worm wheel so as to permit it to rotate with respect to the main driving shaft 57, and connecting the main gear wheel 65 directly with the main driving shaft, so that said main driving shaft and gear wheel will rotate together, and at a much slower rate of speed that the worm wheel 76. The speed of rotation of the main driving shaft with respect to the speed of rotation of the spindle is thus much slower than when the driving shaft is so connected with the worm wheel as to rotate at the same rate of speed with said worm wheel. With the main driving shaft disconnected from or adapted to rotate at a lower speed than the worm wheel and at the same rate of speed with the gear wheel 65 the machine is adapted to be operated manually in an efficient manner, in which case the crank 61 is substituted in place of the power driven pulley 62.

The main gear wheel 65 extends downward farther than the worm wheel or any of the other gear wheels, and the oil being maintained in the oil reservoir in such quantity that its top surface will be below the bottom of the worm wheel and all of the other gear wheels and above the level of the bottom of the gear wheel 65, the latter is adapted to serve at all times to carry up oil for lubricating all of the friction surfaces or bearings of the spindle and all of the gears, and the journal bearings and clutch members, the relatively fast moving gear wheels and worm being above the surface of the oil. The agitation of the oil is thus reduced to a minimum. The entire gear mechanism of the machine is inclosed within a single oil-containing compartment and lubricated with oil used over and over again within such single oil-containing compartment. The gear wheel 58 serves to carry up oil for lubricating the gears, clutch mechanism and bearings when it is not serving as a driving gear, and also then it is directly connected with the driving shaft and in use as a driving gear wheel.

I claim:

1. In a separator of the class described, the combination of an upright bowl-supporting spindle rotatively mounted in suitable bearings, a worm on said spindle, a main driving shaft rotatively mounted, a worm wheel supported by the main driving shaft and in toothed engagement with said worm, driving gear mechanism operatively connected with said worm wheel and comprising a main gear wheel adapted to be connected in fixed relation to the main driving shaft and released from fixed connection with said shaft, and securing means connected with the main driving shaft and adapted to connect said shaft with said main gear wheel and said worm wheel alternatively.

2. In a separator of the class described, the combination of an upright bowl-supporting spindle rotatively mounted in suitable bearings, a worm on said spindle, a main driving shaft rotatively mounted, a worm wheel supported by the main driving shaft and in toothed engagement with said worm, driving gear mechanism operatively connected with said worm wheel and comprising a main gear wheel mounted concentrically with respect to the main driving shaft, securing means connected with the main driving shaft and adapted to connect the main gear wheel in fixed relation to and release the same from fixed connection with said shaft, and means connected and rotatable with the worm wheel and adapted to be connected with said securing means, for securing the worm wheel in fixed relation to the main driving shaft when the main gear wheel is released from fixed connection with said shaft.

3. In a separator of the class described, the combination of an upright bowl-supporting spindle rotatively mounted in suitable bearings, a worm on said spindle, a main driving shaft rotatively mounted, a worm wheel supported by the main driving shaft and in toothed engagement with said worm, driving gear mechanism operatively connected with said worm wheel and comprising a main gear wheel mounted concentrically with respect to the main driving shaft and adapted to be connected in fixed relation to and released from fixed connection with said shaft, securing means connected with the main driving shaft and movable into and out of securing engagement with the main gear wheel, for connecting said wheel in fixed relation to and releasing the same from fixed connection with said shaft, a sleeve encircling the main driving shaft and adapted to engage said securing means when the latter is out of securing engagement with the main gear wheel, and means for operatively connecting said sleeve with the worm wheel.

4. In a separator of the class described, the combination of an upright bowl-supporting spindle rotatively mounted in suitable bearings, a worm on said spindle, a main driving shaft rotatively mounted, a worm wheel supported by the main driving shaft and in toothed engagement with said worm, driving gear mechanism operatively connected with said worm wheel and comprising a main gear wheel mounted concentrically with respect to the main driving shaft, a collar fixed to the main driving shaft and located intermediate said main gear wheel and said worm wheel, a pivoted locking member secured to said collar and movable into and out of operative engagement with said main gear wheel, and means operatively connected with the worm wheel and adapted to be engaged by said pivoted locking member when said locking member is out of engagement with the main gear wheel, for forming a connection between said worm wheel and said pivoted locking member.

5. In a separator of the class described, the combination of an upright bowl-supporting spindle rotatively mounted in suitable bearings, a worm on said spindle, a main driving shaft rotatively mounted, a worm wheel mounted in concentric relation to the main driving shaft and in toothed engagement with said worm, clutch mechanism adapted to be operatively connected with said worm wheel, driving gear mechanism operatively connected with said clutch mechanism, and comprising a main gear wheel mounted concentrically with respect to the main driving shaft, and securing means connected with the main driving shaft and movable into and out of locking engagement with said main gear wheel and said clutch mechanism alternately, for connecting said main gear wheel and the clutch mechanism in fixed relation to the shaft, alternatively.

6. In a separator of the class described, the combination of an upright bowl-supporting spindle rotatively mounted in suitable bearings, a worm on said spindle, a main driving shaft rotatively mounted, a worm wheel mounted in concentric relation to the main driving shaft and in toothed engagement with said worm, clutch mechanism adapted to be operatively connected with said worm wheel, and comprising a hollow sleeve extending through the worm wheel and encircling the main driving shaft, a main gear wheel mounted concentrically with respect to the main driving shaft, gear mechanism operatively connected with said clutch mechanism and in operative engagement with said main gear wheel, a collar fixed to the main driving shaft adjacent to one end of said shaft-encircling sleeve, and a locking member mounted on said collar and movable into locking engagement with said sleeve and said main gear wheel alternatively 7. In a separator of the class described, the combination of an upright bowl-supporting spindle rotatively mounted in suitable bearings, a worm on said spindle, a main driving shaft rotatively mounted, a worm wheel mounted in concentric relation to the main driving shaft and in toothed engagement with said worm, driving gear mechanism operatively connected with said worm wheel and comprising a plurality of toothed gear members mounted in concentric relation to the main driving shaft and located on opposite sides of the worm, clutch mechanism mounted on the main driving shaft and operatively connected with the worm wheel and with one of said toothed gear members at one side of the worm wheel, and securing means fixed to the main driving shaft between the worm wheel and the other one of said toothed gear wheel members, and movable into locking engagement with the last mentioned gear member and said clutch mechanism alternatively.

8. In a separator of the class described, the combination of an upright bowl-supporting spindle mounted in suitable bearings, a worm on said spindle, a main driving shaft rotatively mounted, a worm wheel mounted in concentric relation to the main driving shaft and in toothed engagement with said worm, a clutch member mounted in position to engage the worm wheel at one side thereof, said clutch member having an annular sleeve portion encircling the main driving shaft and extending between said shaft and the worm wheel, means for operatively connecting said clutch member with the shaft, a clutch member mounted in position to encircle said sleeve and movable into and out of clutching engagment with the worm wheel, and a clutch-controlling member adapted to be secured in fixed relation to and in engagement with said last mentioned movable clutch member, for operating the same.

9. In a separator of the class described, the combination of an upright bowl-supporting spindle mounted in suitable bearings, a worm on said spindle, a main driving shaft rotatively mounted, a worm wheel mounted in concentric relation to the main driving shaft and in toothed engagement with said worm, the worm wheel having an annular hub thereon, a clutch member mounted in position to engage said worm wheel at one side of the same, said clutch member having an annular sleeve portion encircling the main driving shaft and extending between said shaft and the annular hub portion of the worm wheel, means for operatively connecting said clutch member with the shaft, a movable clutch member mounted in sliding engagement with the annular hub portion of the worm wheel and movable into and out of clutching engagement with said worm wheel, a clutch-controlling member in engagement with said last mentioned movable clutch member, and means for connecting said clutch-controlling member in fixed relation to the main driving shaft.

10. In a separator of the class described, the combination of an upright bowl-supporting spindle mounted in suitable bearings, a worm on said spindle, a main driving shaft rotatively mounted, a worm wheel mounted in concentric relation to the main driving shaft and in toothed engagement with said worm, a clutch member mounted in position to engage the worm wheel at one side thereof, said clutch member having an annular sleeve portion encircling the main driving shaft and extending between said shaft and the worm wheel, gear wheel mechanism operatively connected with said clutch member, means for connecting said gear wheel mechanism with the main driving shaft, a clutch member mounted in position to encircle said sleeve and movable into and out of clutching engagement with the worm wheel, and a clutch-controlling member adapted to be secured in fixed relation to the main driving shaft and in engagement with said last mentioned movable clutch member, for operating the same.

11. In a separator of the class described, the combination of an upright bowl-supporting spindle mounted in suitable bearings, a worm on said spindle, a main driving shaft rotatively mounted, a worm wheel mounted in concentric relation to the main driving shaft and in toothed engagement with the worm, driving gear mechanism comprising a plurality of gear wheel members supported on opposite sides of said worm wheel and both in concentric relation to the main driving shaft, means for operatively connecting said gear wheel members, means for connecting one of said concentric gear wheel members with the worm wheel, and means for connecting the other of said concentric gear wheel members with the main driving shaft.

12. In a separator of the class described, the combination of an upright bowl-supporting spindle mounted in suitable bearings, a worm on said spindle, a main driving shaft rotatively mounted, a worm wheel mounted in concentric relation to the main driving shaft and in toothed engagement with the worm, driving gear mechanism comprising a plurality of gear wheel members supported on opposite sides of said worm wheel and both in concentric relation to the main driving shaft, means for operatively connecting said concentric gear wheel members, clutch mechanism connected with one of said concentric gear wheel members and adapted to be secured in and released from clutching engagement with the worm wheel, and means for connecting the other one of said concentric gear wheel members in fixed relation to the main driving shaft.

13 In a separator of the class described the combination of an upright bowl-supporting spindle mounted in suitable bearings, a worm on said spindle, a main driving shaft rotatively mounted, a worm wheel mounted in concentric relation to the main driving shaft and in toothed engagement with the worm, driving gear mechanism comprising a plurality of toothed gear wheel members supported on opposite sides of said worm wheel and both in concentric relation to the main driving shaft, connecting gear wheels in toothed engagement with said concentric gear wheel members, means for connecting said connecting gear wheels with each other, clutch mechanism connected with one of said concentric gear wheel members and adapted to be moved into and out of clutching engagement with the worm wheel, and means for connecting the other one of said concentric gear wheel members in fixed relation to the main driving shaft.

14. In a separator of the class described, the combination of an upright bowl-supporting spindle mounted in suitable bearings, a worm on said spindle, a main driving shaft rotatively mounted, a worm wheel mounted in concentric relation to the main driving shaft and in toothed engagement with said worm, a clutch member mounted in position to engage the worm wheel at one side of the same, said clutch member having an annular sleeve portion encircling the main driving shaft and encircled by the worm wheel, means for operatively connecting said clutch member with the shaft, and adapted to permit the same to be released from fixed connection with the shaft, a weighted clutch member rotatively mounted in sliding engagement with said sleeve and movable into and out of clutching engagement with the worm wheel on the opposite side of said wheel from that which is in engagement with the sleeved clutch member and a clutch-controlling member connected with the main driving shaft and in engagement with said weighted clutch member, for operating the same.

JACOB STAMPEN.

Witnesses:
HARRY IRWIN CROMER,
JENNIE L. FISKE.

Copies of this patent may be obtained for five cents each, by addressing the "Commissioner of Patents, Washington, D. C."